(12) United States Patent
Koyama

(10) Patent No.: US 8,437,145 B2
(45) Date of Patent: May 7, 2013

(54) IMAGE DISPLAY APPARATUS

(75) Inventor: Masaya Koyama, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/322,818

(22) PCT Filed: Oct. 22, 2010

(86) PCT No.: PCT/JP2010/068729
§ 371 (c)(1),
(2), (4) Date: Nov. 28, 2011

(87) PCT Pub. No.: WO2011/049206
PCT Pub. Date: Apr. 28, 2011

(65) Prior Publication Data
US 2012/0081878 A1   Apr. 5, 2012

(30) Foreign Application Priority Data

Oct. 23, 2009   (JP) .................................. 2009-244049

(51) Int. Cl.
*H05K 7/02*   (2006.01)
*H05K 7/04*   (2006.01)
(52) U.S. Cl.
USPC ............................ 361/807; 361/809; 361/810
(58) Field of Classification Search .................. 361/807, 361/809, 810, 681, 679.07, 679.21, 679.41, 361/679.44; 248/917–923, 291.12–291.14
See application file for complete search history.

(56) References Cited

U.S. PATENT DOCUMENTS

| | | | | |
|---|---|---|---|---|
| 2,276,776 A * | 3/1942 | William | ........................... | 40/715 |
| 2,630,992 A * | 3/1953 | Seelman | ....................... | 248/453 |
| 3,771,246 A * | 11/1973 | Ebner | ............................. | 40/720 |
| 4,547,468 A | 10/1985 | Jones et al. | | |
| 4,776,117 A * | 10/1988 | Astolfi | ............................. | 40/761 |
| 4,909,300 A | 3/1990 | Horie | | |
| 5,081,774 A | 1/1992 | Kuwano | | |
| 5,723,821 A * | 3/1998 | Klinger et al. | ................ | 174/135 |
| 7,223,098 B2 * | 5/2007 | Suyama et al. | ................ | 431/343 |
| 7,415,108 B2 * | 8/2008 | Toh | ................................ | 379/445 |
| 7,652,873 B2 * | 1/2010 | Lee | .......................... | 361/679.06 |
| 8,089,760 B2 * | 1/2012 | Yi-Chang | ................ | 361/679.59 |
| 2002/0136857 A1 | 9/2002 | Francois | | |

(Continued)

FOREIGN PATENT DOCUMENTS

| GB | 2 254 814 A | 10/1992 |
|---|---|---|
| JP | 62-116083 A | 5/1987 |

(Continued)

*Primary Examiner* — Hung S Bui
(74) *Attorney, Agent, or Firm* — Sughrue Mion, PLLC

(57) ABSTRACT

An image display apparatus including a display body which has a front face and a rear housing placed on a back side of the front face and a support portion which is fixed to the rear housing of the display body or which is integrated with the rear housing to support the display body from a rear side. The support portion has a storage portion to store an article and is configured by a plate member or a linear member that has an inclination portion inclined by a predetermined angle with respect to the front face of the display body. The storage portion is located on the rear side and has a groove portion opened upwards. The upper surface of the inclination portion and an inner wall side surface of one side of the groove portion are contiguous to each other by a gentle slope.

5 Claims, 5 Drawing Sheets

U.S. PATENT DOCUMENTS

| | | |
|---|---|---|
| 2003/0213861 A1 | 11/2003 | Condon et al. |
| 2005/0105257 A1 | 5/2005 | Shimizu et al. |
| 2007/0047187 A1 | 3/2007 | Kumano et al. |
| 2007/0128462 A1 | 6/2007 | Andreussi et al. |
| 2008/0314646 A1 | 12/2008 | Lockwood et al. |

FOREIGN PATENT DOCUMENTS

| | | |
|---|---|---|
| JP | 10-020794 A | 1/1998 |
| JP | 10-254581 A | 9/1998 |
| JP | 11-259171 A | 9/1999 |
| JP | 2000-197555 A | 7/2000 |
| JP | 2002-311840 A | 10/2002 |
| JP | 2002-533777 A | 10/2002 |
| JP | 2004-219645 A | 8/2004 |
| JP | 2005-267661 A | 9/2005 |
| JP | 2005-316867 A | 11/2005 |
| JP | 2007-058031 A | 3/2007 |
| JP | 2008-089088 A | 4/2008 |
| JP | 2008-102744 A | 5/2008 |
| JP | 2009-044568 A | 2/2009 |
| JP | 2009-237497 A | 10/2009 |
| JP | 3155067 U | 11/2009 |
| JP | 2010-085479 A | 4/2010 |
| WO | WO 2005/018854 A1 | 3/2005 |

* cited by examiner

IMAGE DISPLAY APPARATUS

CROSS REFERENCE TO RELATED APPLICATIONS

This application is a National Stage of International Application No. PCT/JP2010/068729 filed Oct. 22, 2010, claiming priority based on Japanese Patent Application No. 2009-244049, filed Oct. 23, 2009, the contents of all of which are incorporated herein by reference in their entirety.

TECHNICAL FIELD

The present invention relates to an image display apparatus for input and output, and more particularly to an image display apparatus effectively used at a restaurant or the like.

BACKGROUND ART

Among restaurants, there are self-order stores having display terminals which are provided on tables and which are used as self-order terminals by customers. The display terminals are not only used as the self-order terminals, but also used to provide various kinds of contents (to video games, regional information, or the like to a customer). Such services are provided even at stores other than self-order stores and have widely been used at restaurants and the like. Both of a display terminal and a book-type menu have usually been prepared on each of tables not only at stores other than self-order stores, but also at self-order stores.

For example, technology related to the above includes an image display apparatus disclosed in Patent Document 1.

More specifically, Patent Document 1 discloses an image display apparatus which has a display body for displaying contents of video games, regional information, or the like and a storage portion in which articles such as a menu can be placed on a rear side of the display body. Furthermore, a support portion for supporting the display body is placed on a lower portion of the display body. A fixing part is provided on a lower portion of the support portion for fixing the display body to a table, a counter, or the like.

With this configuration, an area of the support portion for supporting the display body can be reduced. Articles such as a menu are vertically placed in the storage portion provided on the rear side of the display body. Thus, an area required for the support portion, the menu, and the like can be reduced on the table, the counter, or the like. Therefore, a customer can use a wide area on the table, the counter, or the like.

PRIOR ART

Patent Document

Patent Document 1: JP-A 2002-311840

DISCLOSURE OF THE INVENTION

Problem(s) to be Solved by the Invention

With the aforementioned structure, the image display apparatus disclosed in Patent Literature 1 can substantially eliminate an area required for a menu or the like from a large area required for both of an image display apparatus and a menu or the like.

According to Patent Document 1, however, the support portion for supporting the display body and the storage portion for placing the menu or the like are separately located and should be fixed individually by using various dedicated parts. Therefore, the number of parts increases. As a result, Patent Document 1 is disadvantageous in that an assembly operation, an installation operation, and the like are laborious because the support portion and the storage portion are fixed individually to the display body.

The present invention is to solve such conventional problems. It is, therefore, an object of the present invention to provide an image display apparatus having a storage portion for placing a menu or the like without the need of any dedicated part.

Another object of the present invention is to provide an image display apparatus that can simplify an assembly operation, an installation operation, and the like by reducing the number of parts.

Means to Solve the Problem

According to the present invention, there is provided an image display apparatus characterized by comprising: a display body; and a support portion for supporting the display body on a rear side of the display body, the support portion having a configuration with which a storage portion in which an article can be placed is integrated.

More specifically, according to an aspect of the present invention, reduction of the number of parts is achieved by unifying the storage portion and the support portion.

EFFECT(S) OF THE INVENTION

According to the present invention, an image display apparatus having a storage portion for placing a menu or the like without the need of any dedicated part can be obtained by unifying the storage portion and the support portion. Furthermore, the number of parts of the image display apparatus can be reduced. As a result, an assembly operation and an installation operation of the image display apparatus and the like can be simplified by reducing the number of parts.

MODE(S) FOR CARRYING OUT THE INVENTION

An embodiment of the present invention will be described below with reference to the drawings.

Figure 1:
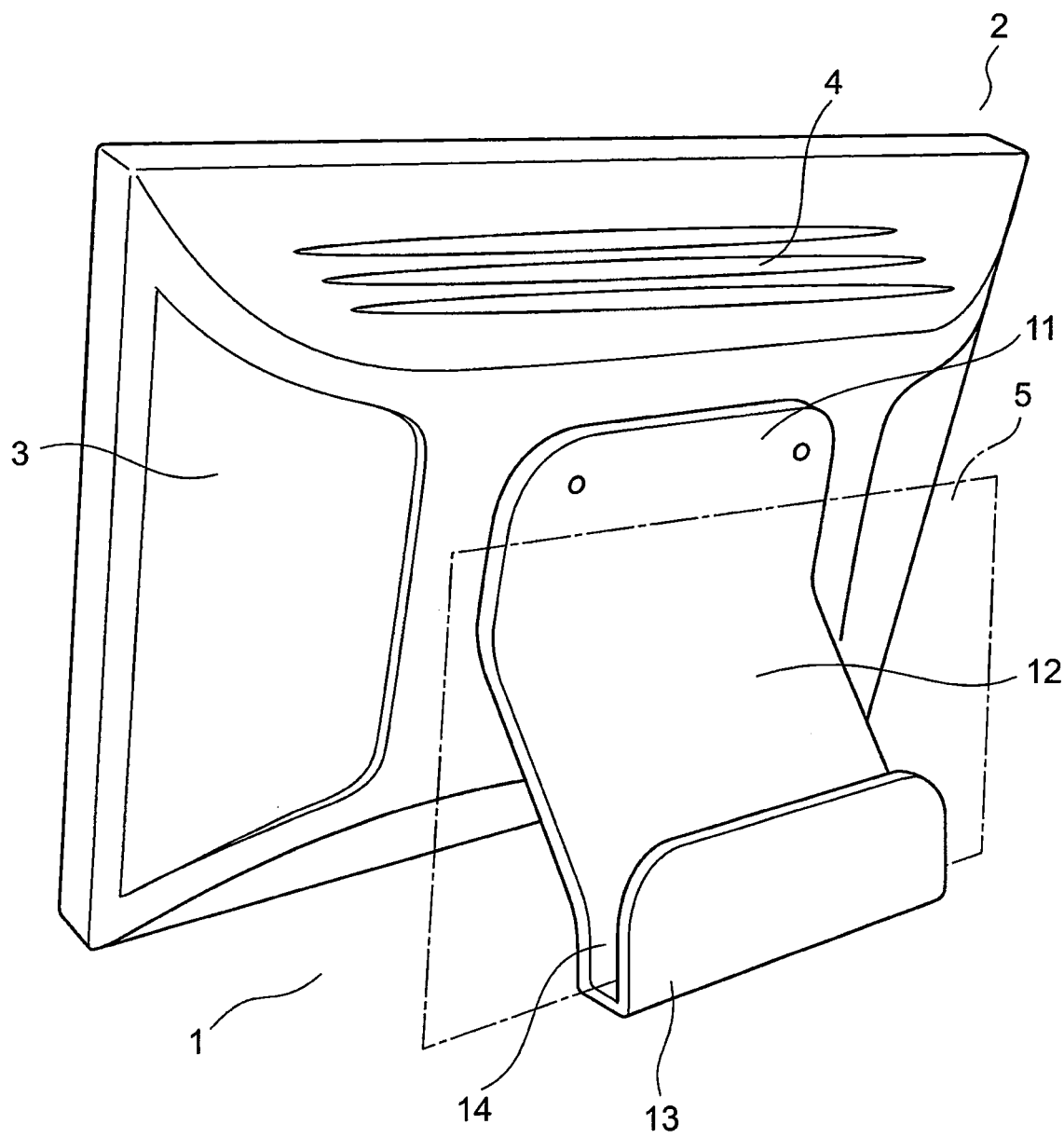
FIG. 1 is a perspective view of an image display apparatus according to the present invention as seen from a rear side of the image display apparatus.
Figure 2:
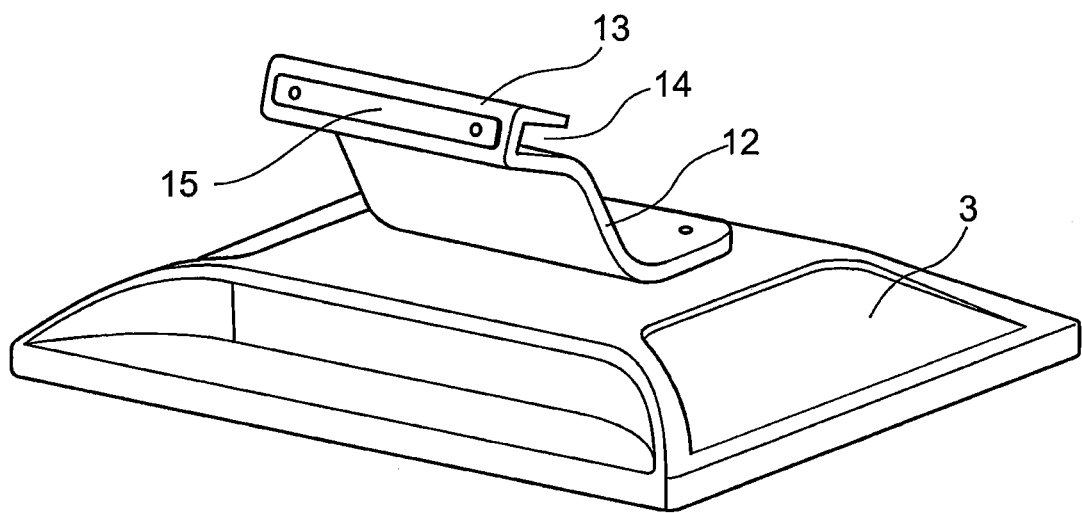
FIG. 2 is a perspective view of the image display apparatus according to the present invention as seen from a bottom side of the image display apparatus.
Figure 3:
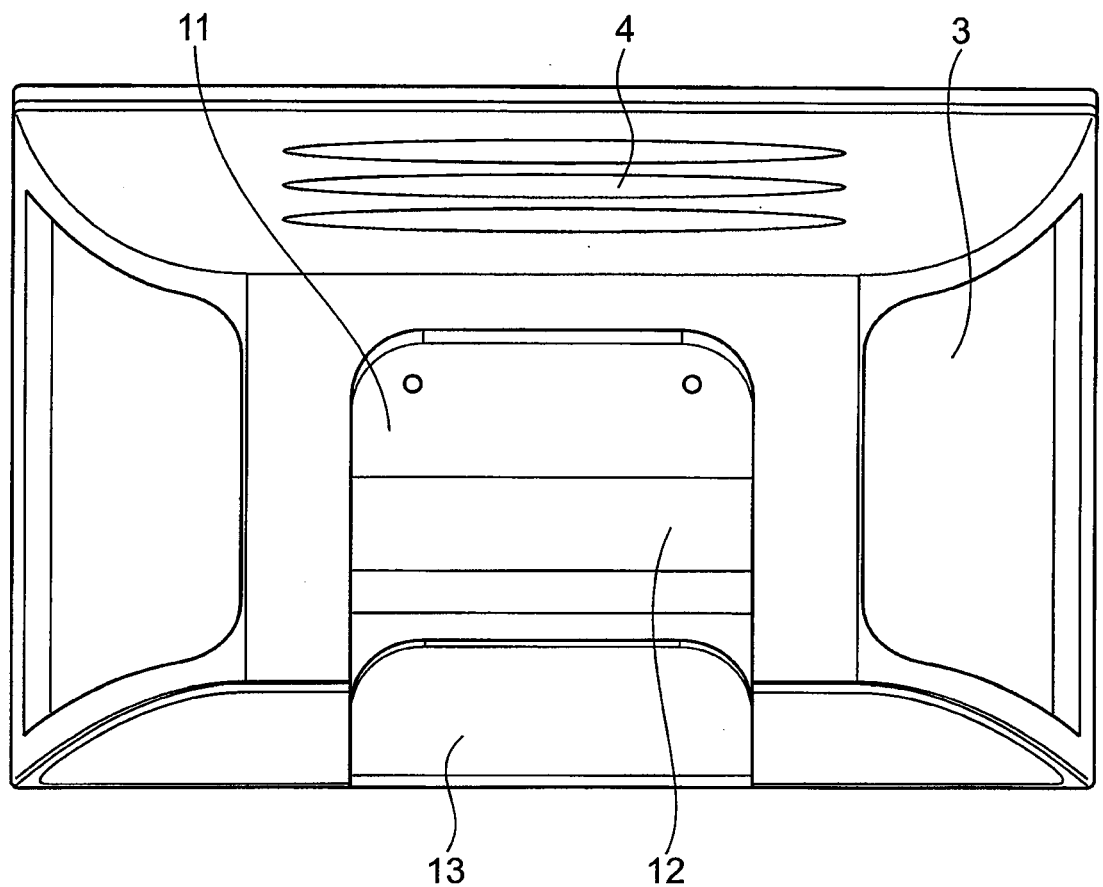
FIG. 3 is a rear view of the image processing apparatus according to the present invention.
Figure 4:
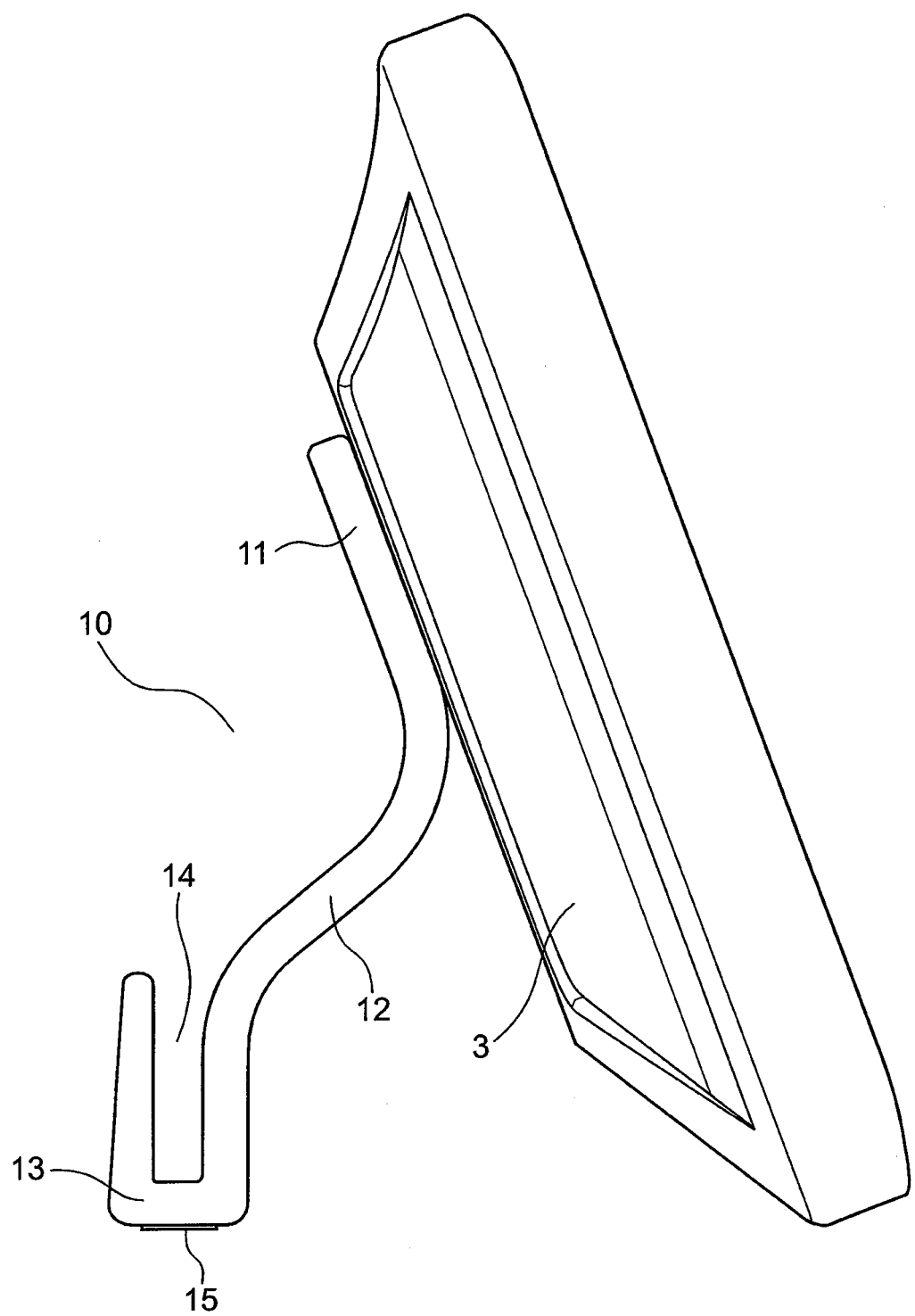
FIG. 4 is a side view of the image processing apparatus according to the present invention.
Figure 5:
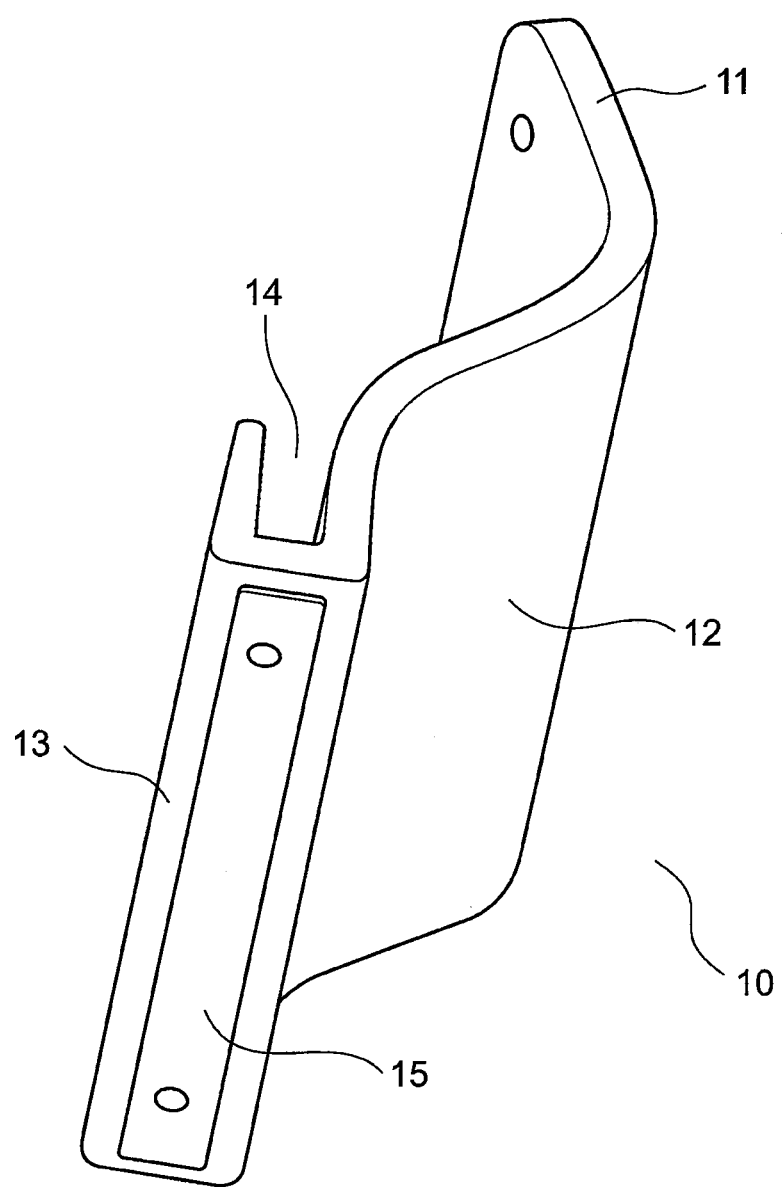
FIG. 5 is a perspective view of a support portion used in the image display apparatus according to the present invention.

FIGS. 1 and 2 are perspective views of an image display apparatus according to the present invention. FIG. 3 is a rear view of the image processing apparatus according to the present invention, and FIG. 4 is a side view thereof. FIG. 5 is a perspective view of a support portion.

As shown in FIGS. 1 to 4, an image display apparatus 1 according to the present invention has a display body 2 and a support portion 10 fixed to a rear housing 3. The support portion 10 includes a fixing part 11, an intermediate part 12, and a bottom part 13.

The fixing part 11 of the support portion 10 shown in FIGS. 1 to 4 has holes defined therein. The support portion 10 is fixed to locations except exhaust heat holes 4 defined in the rear housing 3 by screws. The illustrated intermediate part 12 is formed by a plate member. The intermediate part 12 extends from the fixing part 11 so as to have a predetermined angle of inclination with respect to a front face of the display body 2. The bottom part 13, which is connected to the intermediate part 12, defines a storage portion 14 extending in parallel to a display screen of the display body 2. Articles such as a menu are stocked or placed in the storage portion 14.

As shown in FIGS. 2 and 5, a fixing member 15 is provided on the bottom of the bottom part 13. With the fixing member 15 and a lower part of the display body 2, as shown in FIGS. 1 and 4, the image display apparatus stands on a table or the like in a state in which it holds a certain angle of inclination. The disclosed fixing member 15 is made of a material having flexibility such as rubber.

The image display apparatus 1 shown in FIGS. 1 to 4 achieves reduction of the number of parts of the image display apparatus 1 by unifying or integrating the storage portion 14 and the support portion 10. In the example shown in FIGS. 1 to 5, the rear housing 3 and the support portion 10 are formed as separate members. However, the rear housing 3 and the support portion 10 may be integrated with each other. Alternatively, when the rear housing 3 is formed of a plurality of parts, at least one part of the rear housing 3 may be integrated with the support portion 10. With those configurations, the number of parts of the image display apparatus 1 can further be reduced.

Furthermore, as shown in FIG. 2, provision of the fixing member 15 on the bottom of the bottom part 13 of the support portion 10 prevents overturning and falling of the image display apparatus 1, damage to the table, and the like. Therefore, the number of parts of the image display apparatus can further be reduced. Aligned holes may be formed in both the bottom of the bottom part 13 and the fixing member 15, and the image display apparatus 1 may be fixed to the table by screws or the like. In such a case, further stability can be achieved. Another fixing method includes fixing the image display apparatus by mounting magnets on the bottom of the bottom part 13 and the table. In any case, the illustrated support portion 10 has such flexibility that a fixing method suitable for the fixing location can be used.

In the illustrated example, the rear housing 3 of the display body 2 and the support portion 10 are fixed by the screws. However, other fixing methods may be used. Projections may be formed on a surface of the rear housing 3, and recesses may be formed in a surface of the fixing part 11. The projections may be fitted into the recesses under pressure. Inversely, recesses may be formed in the rear housing 3, and projections may be formed on the support portion 10. With such a configuration, the number of parts of the image display apparatus 1 can further be reduced.

As shown in FIGS. 1 to 4, the support portion 10 is fixed to a location except the exhaust heat holes 4 of the rear housing 3 and spaced from the exhaust heat holes 4. Therefore, the support portion 10, the menu 5, and the like are prevented from being an obstacle to exhaust heat and thus exerting an adverse influence on the display body 2.

As shown in FIGS. 1, 2, 4, and 5, the storage portion 14 is in the form of a groove. Thus, the storage portion 14 can advantageously be recognized clearly as a storage position for the menu 5 or the like at a restaurant or the like.

The storage portion 14 may have a configuration other than the groove configuration. The storage portion 14 may be used as a storage position for articles other than the menu, such as seasonings.

Since the support portion 10 is located on the rear side of the display body 2 as shown in FIGS. 1 to 4, the display screen on the front side of the display body 2 is not covered with the support portion 10, the menu, or the like. Moreover, at least a portion of the support portion 3, such as the storage portion 14 may be configured so as to project from an upper surface or a side surface of the display body 2 or the like. In this event, a customer can collaterally recognize the presence of the storage portion at a restaurant or the like when the customer sees the front side of the image display apparatus 1.

The shape of the support portion 10 can be changed relatively flexibly in consideration of the design. For example, the support portion 10 may be formed by a linear member or the like.

Furthermore, according to the present invention, an image display apparatus 1 having a function of height adjustment or a swing function may be used, and the support portion 10 may be provided with a function of height adjustment or a swing function. Thus, the image display apparatus 1 may be configured so that the display screen of the display body 2 can be adjusted optimally depending upon an angle of lighting. This configuration makes it possible to eliminate difficulties in viewing that would result from ambient light reflection.

Moreover, the above embodiment has described a case in which the support portion 10 is fixed to the back of the display body 2. The present invention is not limited to this example at all. For example, the support portion 10 may have a fixing part fixed to the side of the display body 2 and support the display body on the rear side of the display body.

INDUSTRIAL APPLICABILITY

The present invention is applicable not only to a liquid crystal display device, but also to various types of thin display devices such as an organic EL display device.

This application claims the benefit of priority from Japanese patent application No. 2009-244049, filed on Oct. 23, 2009, the disclosure of which is incorporated herein in its entirety by reference.

DESCRIPTION OF REFERENCE NUMERALS 1 image display apparatus
2 display body
3 rear housing
4 exhaust heat hole
5 menu or the like
10 support portion
11 fixing part
12 intermediate part
13 bottom part
14 storage portion
15 fixing member

The invention claimed is:

1. An image display apparatus comprising a display body which has a front face and a rear housing placed on a back side of the front face and a support portion which is fixed to the rear housing of the display body or which is integrated with the rear housing of the display body to support the display body from a rear side of the rear housing, and which has a storage portion integrated with the support portion to store an article, wherein:

the support portion is configured by a plate member or a linear member and has an inclination portion inclined by a predetermined angle with respect to the front face of the display body;

wherein:

the storage portion is located on the rear side of the rear housing and has a groove portion opened upwards; and wherein:

an upper surface of the inclination portion and an inner wall side surface of one side of the groove portion are contiguous to each other by a gentle slope.

2. The image display apparatus as claimed in claim 1, wherein the support portion has a bottom part which is connected to the inclination portion which defines the storage portion.

3. The image display apparatus as claimed in claim 2, wherein the storage portion has a fixing member on a bottom of the bottom part.

4. The image display apparatus as claimed in claim 1, wherein the support portion has a configuration such that an angle of the support portion is changed relative to the display body.

5. The image display apparatus as claimed in claim 1, wherein the storage portion extends parallel to the front face of the display body on the rear side of the rear housing.

* * * * *